United States Patent
Chang et al.

(10) Patent No.: US 9,143,183 B2
(45) Date of Patent: Sep. 22, 2015

(54) COORDINATE TRANSMITTER, COORDINATE RECEIVER AND COORDINATE TRANSCEIVER

(71) Applicant: Wistron Corporation, New Taipei (TW)

(72) Inventors: Chih-Hsiung Chang, New Taipei (TW); Yi-Shu Chen, New Taipei (TW); Shih-Chieh Liao, New Taipei (TW)

(73) Assignee: Wistron Corporation, New Taipei (TW)

( * ) Notice: Subject to any disclaimer, the term of this patent is extended or adjusted under 35 U.S.C. 154(b) by 3 days.

(21) Appl. No.: 14/070,585

(22) Filed: Nov. 4, 2013

(65) Prior Publication Data

US 2015/0063429 A1    Mar. 5, 2015

(30) Foreign Application Priority Data

Aug. 29, 2013  (TW) .............................. 102131066 A

(51) Int. Cl.
*H04W 4/02* (2009.01)
*H04B 1/40* (2015.01)
*H04B 1/04* (2006.01)
*H04B 1/16* (2006.01)

(52) U.S. Cl.
CPC .. *H04B 1/40* (2013.01); *H04B 1/04* (2013.01); *H04B 1/16* (2013.01)

(58) Field of Classification Search
CPC ....................................................... H04W 4/02
USPC ........................................................ 375/219
See application file for complete search history.

(56) References Cited

U.S. PATENT DOCUMENTS

| | | | |
|---|---|---|---|
| 7,889,126 B2 | 2/2011 | Chen | |
| 2004/0176106 A1* | 9/2004 | Tendler | ...................... 455/456.5 |
| 2007/0232328 A1* | 10/2007 | Kramarz-Von Kohout | ........................ 455/456.2 |
| 2009/0033552 A1* | 2/2009 | Kirmuss et al. | ............ 342/357.08 |
| 2009/0215425 A1 | 8/2009 | Ebersberger | |
| 2014/0364092 A1* | 12/2014 | Rose | ........................... 455/414.1 |

FOREIGN PATENT DOCUMENTS

TW        201002041        1/2010

OTHER PUBLICATIONS

"Office Action of Taiwan Counterpart Application with partial English translation", issued on Mar. 27, 2015, p. 1-p. 6.
"Office Action of Taiwan Counterpart Application" with partial English translation, issued on Jun. 15, 2015, p. 1-p. 13.

* cited by examiner

*Primary Examiner* — Michael Neff
(74) *Attorney, Agent, or Firm* — Jianq Chyun IP Office

(57) ABSTRACT

A coordinate transmitter, a coordinate receiver and a coordinate transceiver are provided. The coordinate transmitter includes a global positioning system (GPS) module, a processing unit and a communication module. The global positioning system module receives a global positioning system signal set. The processing unit captures a coordinate data string from the GPS signal set. The processing unit replaces at least one English letter data and at least one punctuation mark data in the coordinate data string. The processing unit converts the replaced coordinate data string into a dual tone multi frequency (DTMF) signal set. The communication module transmits the DTMF signal set.

5 Claims, 3 Drawing Sheets

COORDINATE TRANSMITTER, COORDINATE RECEIVER AND COORDINATE TRANSCEIVER

CROSS-REFERENCE TO RELATED APPLICATION

This application claims the priority benefit of Taiwan application serial no. 102131066, filed on Aug. 29, 2013. The entirety of the above-mentioned patent application is hereby incorporated by reference herein and made a part of this specification.

BACKGROUND OF THE INVENTION

1. Field of the Invention

The invention relates a transmitter, a receiver and a transceiver, and more particularly to a coordinate transmitter, a coordinate receiver and a coordinate transceiver.

2. Description of Related Art

With continuous development of the technology, more and more mobile devices are manufactured with a signal receiving module for Global Positioning System (GPS) configured for the mobile devices to perform functions such as positioning and navigation according to GPS signals. However, in case the mobile devices are in areas with poor telecommunication infrastructure, functions such as positioning and tracking the mobile devices may not be easily accomplished through data communication services.

SUMMARY OF THE INVENTION

Accordingly, the invention is directed a coordinate transmitter, a coordinate receiver and a coordinate transceiver, capable of accomplishing GPS positioning and related tracking functions even when a mobile device is an area with poor telecommunication infrastructure.

The invention provides a coordinate transmitter, which includes a global positioning system module, a processing unit and a communication module. The global positioning system module receives a global positioning system signal set. The processing unit is coupled to the global positioning system module. The processing unit captures a coordinate data string from the global positioning system signal set. The coordinate data string includes at least one numeric data, at least one English letter data and at least one punctuation mark data. The processing unit replaces the at least one English letter data and the at least one punctuation mark data in the coordinate data string. The processing unit converts the replaced coordinate data string into a dual tone multi frequency signal set. The communication module is coupled to the processing unit and configured for transmitting the dual tone multi frequency signal set.

In an embodiment of the invention, the processing unit replaces the at least one English letter data and the at least one punctuation mark data in the coordinate data string according to a dual tone multi frequency conversion table.

In an embodiment of the invention, the at least one English letter data includes a latitude symbol and a longitude symbol, and the at least one punctuation mark data includes at least one comma and at least one full stop. Further, the processing unit is configured for replacing at least one comma with at least one first symbol, replacing at least one full stop with at least one second symbol, replacing a latitude symbol with a third symbol and replacing a longitude symbol with a fourth symbol.

In an embodiment of the invention, the processing unit is further configured for appending a fifth symbol in front of the replaced coordinate data string, and appending a sixth symbol at back of the replaced coordinate data string.

The invention provides a coordinate receiver, which includes a communication module and a processing unit. The communication module receives a dual tone multi frequency signal set from a coordinate transmitter. The processing unit is coupled to the communication module. The processing unit decodes the dual tone multi frequency signal set so as to generate a data string. The data string includes at least one numeric data, at least one first symbol, at least one second symbol, a third symbol, and a fourth symbol. The processing unit replaces the at least one first symbol, the at least one second symbol, the third symbol and the fourth symbol in the data string. The processing unit analyzes the replaced data string to obtain a coordinate data string of the coordinate transmitter.

In an embodiment of the invention, the processing unit is configured for replacing at least one first symbol with at least one comma, replacing at least one second symbol with at least one full stop, replacing a third with a latitude symbol and replacing a fourth symbol with a longitude symbol.

In an embodiment of the invention, the data string further includes a fifth symbol indicating a start of the data string and a sixth symbol indicating an end of the data string. Further, the processing unit is further configured for removing the fifth symbol and the sixth symbol.

The invention provides a coordinate transceiver which includes a coordinate transmitter and a coordinate receiver. The coordinate transmitter includes a global positioning system module, a first processing unit and a first communication module. The global positioning system module receives a global positioning system signal set. The first processing unit is coupled to the global positioning system module. The processing unit captures a first coordinate data string from the global positioning system signal set. The first coordinate data string includes at least one first numeric data, at least one English letter data and at least one punctuation mark data. The processing unit replaces the at least one English letter data and the at least one punctuation mark data in the first coordinate data string. The processing unit converts the replaced first coordinate data string into a first dual tone multi frequency signal set. The first communication module is coupled to the first processing unit and configured for transmitting the first dual tone multi frequency signal set. The coordinate receiver includes a second communication module and a second processing unit. The second communication module receives a second dual tone multi frequency signal set from another coordinate transceiver. The second processing unit is coupled to the second communication module. The second processing unit decodes the second dual tone multi frequency signal set so as to generate a data string. The data string includes at least one second numeric data, at least one first symbol, at least one second symbol, a third symbol, and a fourth symbol. The processing unit replaces the at least one first symbol, the at least one second symbol, the third symbol and the fourth symbol in the data string. The processing unit analyzes the replaced data string to obtain a second coordinate data string of another coordinate transceiver.

Based on above, the coordinate transmitter proposed by the embodiments of the invention is capable of replacing the mark in the coordinate data string, followed by performing broadcast with the corresponding dual tone multi frequency signal set, and after the dual tone multi frequency signal set is received by the coordinate receiver proposed by the embodiments of the invention, the coordinate data string of the coordinate transmitter may be correspondingly reverted to obtain the location of the coordinate transmitter.

To make the above features and advantages of the disclosure more comprehensible, several embodiments accompanied with drawings are described in detail as follows.

DESCRIPTION OF THE EMBODIMENTS

Figure 1:
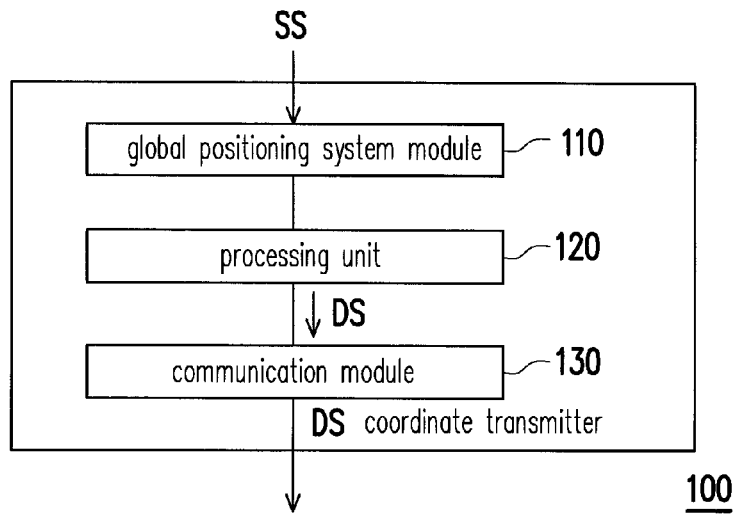
FIG. 1 is a schematic diagram illustrating a coordinate transmitter according to an embodiment of the invention.

FIG. 1 is a schematic diagram illustrating a coordinate transmitter according to an embodiment of the invention. In the present embodiment, a coordinate transmitter 100 includes a global positioning system module 110, a processing unit 120 and a communication module 130. The coordinate transmitter 100 is, for example, a walkie talkie capable of transmitting a Very High Frequency (VHF) signal and an Ultra High Frequency (UHF) signal (e.g., a Dual Tone Multi Frequency (DTMF) signal) or other similar communication devices. The global positioning system module 110 is a communication element capable of receiving a global positioning system signal set SS. The processing unit 120 is coupled to the global positioning system module 110. The processing unit 120 may, for example, access various programming codes stored in a storage unit (not shown) of the coordinate transmitter 100, so as to execute steps in the method proposed in the invention. The storage unit could be, for example, a memory, a hard disk or other devices capable of storing data and/or programming codes.

The processing unit 120 is, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, an ARM-based processor, and the like. The communication module 130 is, for example, a communication element coupled to the processing unit 120 and capable of transmitting a dual tone multi frequency signal, but the invention is not limited thereto.

Figure 2:
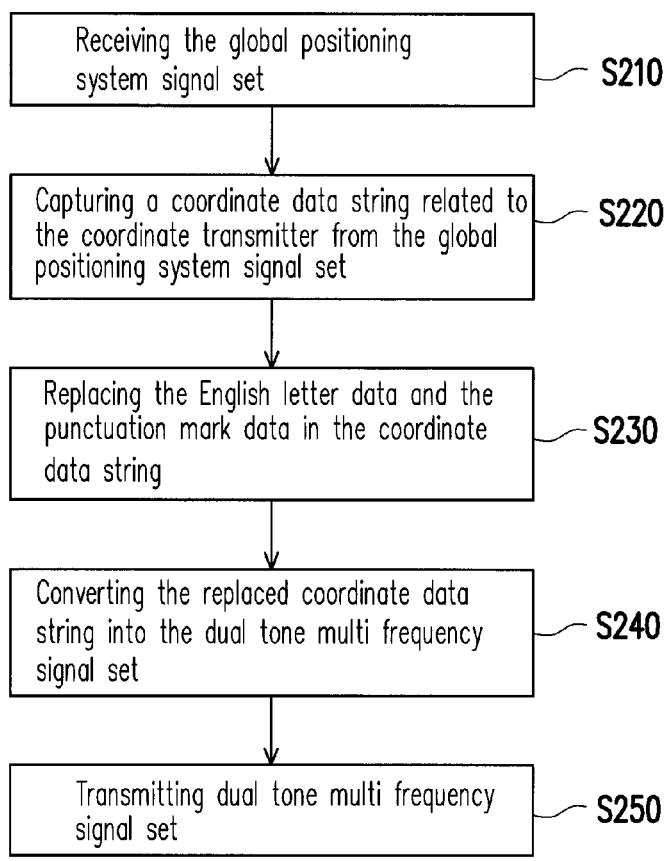
FIG. 2 is a flowchart of a method of transmitting a coordinate data according to an embodiment of the invention.

FIG. 2 is a flowchart of a method of transmitting a coordinate data according to an embodiment of the invention. The method proposed by the present embodiment could be implemented by the coordinate transmitter 100 depicted in FIG. 1, and each step of the present embodiment is described in detail with reference to each element depicted in FIG. 1.

In brief, after the global positioning system signal set SS is received by the global positioning system module 110, the coordinate transmitter 100 proposed by the embodiment of the invention may control the processing unit 120 to perform a specific process as to convert a coordinate data string in the global positioning system signal set SS into a dual tone multi frequency signal set DS. Subsequently, the communication module 130 may transmit the dual tone multi frequency signal set DS. Accordingly, when the dual tone multi frequency signal set DS transmitted by the coordinate transmitter 100 is received by other devices, the coordinate data of the coordinate transmitter 100 may then be obtain from therein. Detailed description is described hereinafter.

In step S210, the global positioning system module 110 may receive the global positioning system signal set SS. The global positioning system signal set SS is, for example, a data string generated by a satellite according to a location of the coordinate transmitter 100, and the data string may include information related to the location of the coordinate transmitter.

In an embodiment, the satellite may adopt a coded format of NMEA-0183 for representing the global positioning system signal set SS. Such coded format may include sentences such as GGA, GLL, GSA, GSV, MSS, RMC, VTG and ZDA, and meanings of the sentences may refer to contents listed in Table 1 below.

TABLE 1

| Sentence | Sentence contents |
|---|---|
| GGA | UTC time, latitude value, longitude value, GPS positioning status (invalid, point positioning, differential), number of GPS satellites in view, HDOP value, GPS ellipsoidal height, antenna altitude, age of differential data, differential reference station ID, checksum |
| GLL | UTC time, latitude value, longitude value, positioning status (invalid, point positioning, differential), checksum |
| GSA | Positioning modes (M—manual, enforcing a 2D or 3D positioning; A—automatic, automatically performing a 2D or 3D positioning), ID number of the satellite in use for positioning, PDOP value, HDOP value, VDOP value. |
| GSV | Number of GPS satellites in view, PRN number, elevation angle of satellite, angle (azimuth) to true north, signal to noise ratio |
| MSS | Beacon signal intensity, signal to noise ratio, beacon frequency, serial transmission velocity, channel number |
| RMC | UTC time, positioning status (A—available, V—void), latitude value, longitude value, speed over the ground, date and so on |
| VTG | Speed over the ground and so on |
| ZDA | UTC time, year, month, date, local time zone, local time zone in minutes |

Subsequently, in step S220, the processing unit 120 may capture a coordinate data string related to the coordinate transmitter 100 from the global positioning system signal set SS. For instance, it is assumed that the global positioning system signal set SS includes the data strings of "$GPGGA, 121252.000, 3937.3032, N, 11611.6046, E, 1, 05, 2.0, 45.9, M, −5.7, M, , 0000*77", "$GPRMC, 121252.000, A, 3958.3032, N, 11629.6046, E, 15.15, 359.95, 070306, , , A*54", "$GPVTG, 359.95, T, , M, 15.15, N, 28.0, K, A*04", "$GPGGA, 121253.000, 3937.3090, N, 11611.6057, E, 1, 06, 1.2, 44.6, M, −5.7, M, , 0000*72", "$GPGSA, A, 3, 14, 15, 05, 22, 18, 26, , , , , , 2.1, 1.2, 1.7*3D" and "$GPGSV, 3, 3, 10, 29, 07, 074, , 30, 07, 163, 28*7D". Accordingly, in view of the contents in Table 1, it could be observed that the data string of "$GPRMC, 121252.000, A, 3958.3032, N, 11629.6046, E, 15.15, 359.95, 070306, , , A*54" includes the coordinate data having the latitude vale and the longitude value of the coordinate transmitter 100. Therefore, the processing unit 120 may then capture a data string of "3958.3032, N, 11629.6046, E" from the data string of "$GPRMC, 121252.000, A, 3958.3032, N, 11629.6046, E, 15.15, 359.95, 070306, , , A*54". In the present embodiment, the data string of "3958.3032, N, 11629.6046, E" is deemed as the coordinate data string of the coordinate transmitter 100 which includes a numeric data (e.g., 1 to 9), an English letter data and a punctuation mark data. The English letter data includes, for example, a latitude symbol (N) and a longitude symbol (E), and the punctuation mark data includes, for example, a comma (",") and a full stop (".").

However, since the coordinate data string includes data incapable of being converted into the dual tone multi frequency signal (e.g., ",", ".", "N" and "E" and so on), it is required for the processing unit 120 to properly replace said data incapable of being converted with data in other forms, so that the coordinate data string may be successfully converted into the dual tone multi frequency signal.

TABLE 2

|        | 1209 Hz | 1336 Hz | 1477 Hz | 1633 Hz |
|--------|---------|---------|---------|---------|
| 697 Hz | 1       | 2       | 3       | A       |
| 770 Hz | 4       | 5       | 6       | B       |
| 852 Hz | 7       | 8       | 9       | C       |
| 941 Hz | *       | 0       | #       | D       |

Table 2 is an example of a dual tone multi frequency conversion table. In view of Table 2 which defines a conversion method corresponding to each of the numeric data is defined therein, however, conversion methods corresponding to the English letter data (e.g., N and E) and the punctuation mark data (e.g., "," and ".") are not defined.

Accordingly, in step S230, the processing unit 120 may replace the English letter data and the punctuation mark data in the coordinate data string. More specifically, the processing unit 120 may replace the comma (e.g., ",") in the coordinate data string with a first symbol (e.g., "*"), replace the full stop (e.g., ",") in the coordinate data string with a second symbol (e.g., "C"), replace the latitude symbol (N) with a third symbol (e.g., "A") and replace the longitude symbol (E) with a fourth symbol (e.g., "B"). In addition, the processing unit 120 may also append a fifth symbol (e.g., "#") and a sixth symbol (e.g., "B") respectively in front and at back of the replaced coordinate data string, which are configured to indicate a start and an end of the coordinate data string, respectively. As a result, after above operations are completed by the processing unit 120, the replaced coordinate data string is, for example, "#3958C3032*A*11629C6046*BD".

From another prospective, since conversion methods for marks (e.g., the comma, the full stop, the latitude symbol and the longitude symbol) are not defined in the dual tone multi frequency conversion table of Table 2, in case the processing unit 120 directly converts the coordinate data string into the dual tone multi frequency signal without performing step S230, an error may occur in the processing unit 120 during the conversion, such that the conversion may not be successfully completed.

On the other hand, after step S230 is completed, the corresponding method for converting each mark included in the replaced coordinate data string may be found in the dual tone multi frequency conversion table in Table 2, thus the processing unit 120 may convert the replaced coordinate data string into the dual tone multi frequency signal set DS in step S240. More specifically, the processing unit 120 may decide the conversion method according to Table 2. Take the fifth symbol (e.g., "#") as an example, when the processing unit 120 is converting the fifth symbol (e.g., "#") into the corresponding dual tone multi frequency signal, the processing unit 120 may utilize 941 Hz as a fundamental frequency while superimposing an audio frequency of 1477 Hz on said fundamental frequency, so as to generate a signal waveform corresponding to the fifth symbol (e.g., "#"). Take "3" as another example, when the processing unit 120 is converting "3" into the corresponding dual tone multi frequency signal, the processing unit 120 may utilize 697 Hz as a fundamental frequency while superimposing an audio frequency of 1633 Hz on said fundamental frequency, as to generate a signal waveform corresponding to "3". The conversion methods for the rest of marks may be deduced by analogy, thus further description is omitted hereinafter.

Thereafter, in step S250, the processing unit 120 may control the communication module 130 to transmit the dual tone multi frequency signal set DS. Accordingly, when the dual tone multi frequency signal set DS is received by a coordinate receiver, as long as the coordinate receiver is capable of convert the dual tone multi frequency signal set DS back to the coordinate data string (i.e., the data string of "3958.3032, N, 11629.6046, E"), said coordinate receiver may then correspondingly obtain the coordinate data of the coordinate transmitter 100. Detailed description regarding characteristics the coordinate receiver is described as below.

Figure 3:
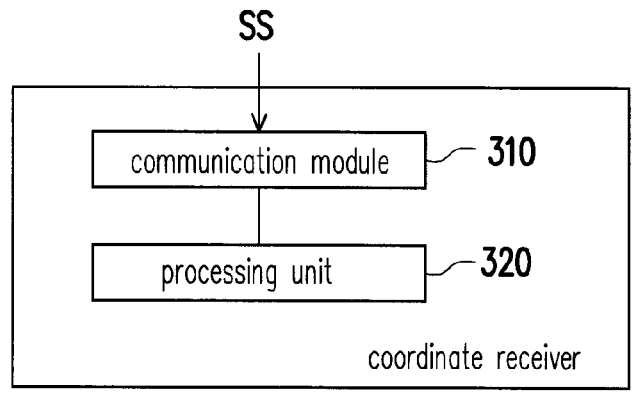
FIG. 3 is a schematic diagram illustrating a coordinate receiver according to an embodiment of the invention.

Referring to FIG. 3, FIG. 3 is a schematic diagram illustrating a coordinate receiver according to an embodiment of the invention. In the present embodiment, a coordinate receiver 300 includes a communication module 310 and a processing unit 320. The coordinate receiver 300 is, for example, a walkie talkie capable of receiving a VHF signal and a UHF signal (e.g., a dual tone multi frequency signal) or other similar communication devices. The communication module 310 is, for example, a device capable of receiving the dual tone multi frequency signal. Characteristic of the processing unit 320 is similar to that of the processing unit 120 depicted in FIG. 1, thus related description is omitted hereinafter.

Figure 4:
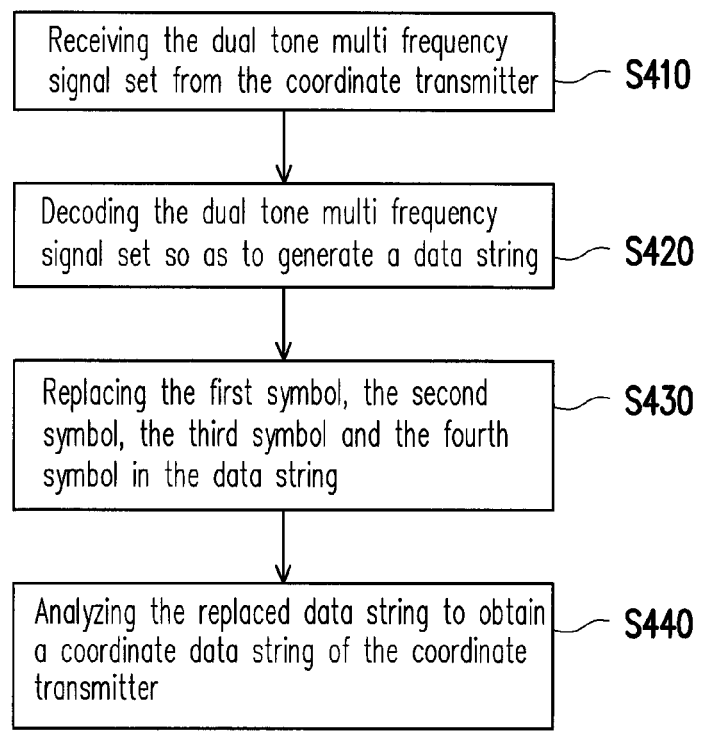
FIG. 4 is a flowchart of a method of obtaining a coordinate data according to an embodiment of the invention.

FIG. 4 is a flowchart of a method of obtaining a coordinate data according to an embodiment of the invention. The method proposed by the present embodiment may be implemented by the coordinate receiver 300 depicted in FIG. 3, and each step of the present embodiment is described in detail with reference to each element depicted in FIG. 1 and FIG. 3.

In step S410, the communication module 310 may receive the dual tone multi frequency signal set DS from the coordinate transmitter 100. Subsequently, in step S420, the processing unit 320 may decode the dual tone multi frequency signal set DS so as to generate a data string. More specifically, the processing unit 320 may obtain the data string such as "#3958C3032*A*11629C6046*BD" by decoding each waveform corresponding to the dual tone multi frequency signal set DS.

Subsequently, in step S430, the processing unit 320 may replace the first symbol (e.g., "*"), the second symbol (e.g., "C"), the third symbol (e.g., "A") and the fourth symbol (e.g., "B") in said data string. More specifically, the processing unit 320 may replace the first symbol with the commas (","), replace the second symbol with the full stop ("."), replace the third symbol with the latitude symbol (N) and replace the fourth symbol with the longitude symbol (E). In addition, the processing unit 320 may also remove the fifth symbol ("#") and the sixth symbol ("D") respectively indicate the start and the end of the data string. Accordingly, the replaced data string is, for example, "3958.3032, N, 11629.6046, E". In step S440, the processing unit 320 may analyze the replaced data string to obtain a coordinate data string of the coordinate transmitter.

In view of the foregoing embodiments, the coordinate transmitter 100 may transmit the coordinate data string thereof to the coordinate receiver 300 without any telecommunication infrastructure (e.g., a base station). Therefore, in case the coordinate transmitter 100 the coordinate receiver 300 are in areas (e.g., mountain region) without deployments of the telecommunication infrastructure, the coordinate transmitter 100 may still provide a GPS coordinate thereof to the coordinate receiver 300 by using the method taught in the foregoing embodiments.

Figure 5:
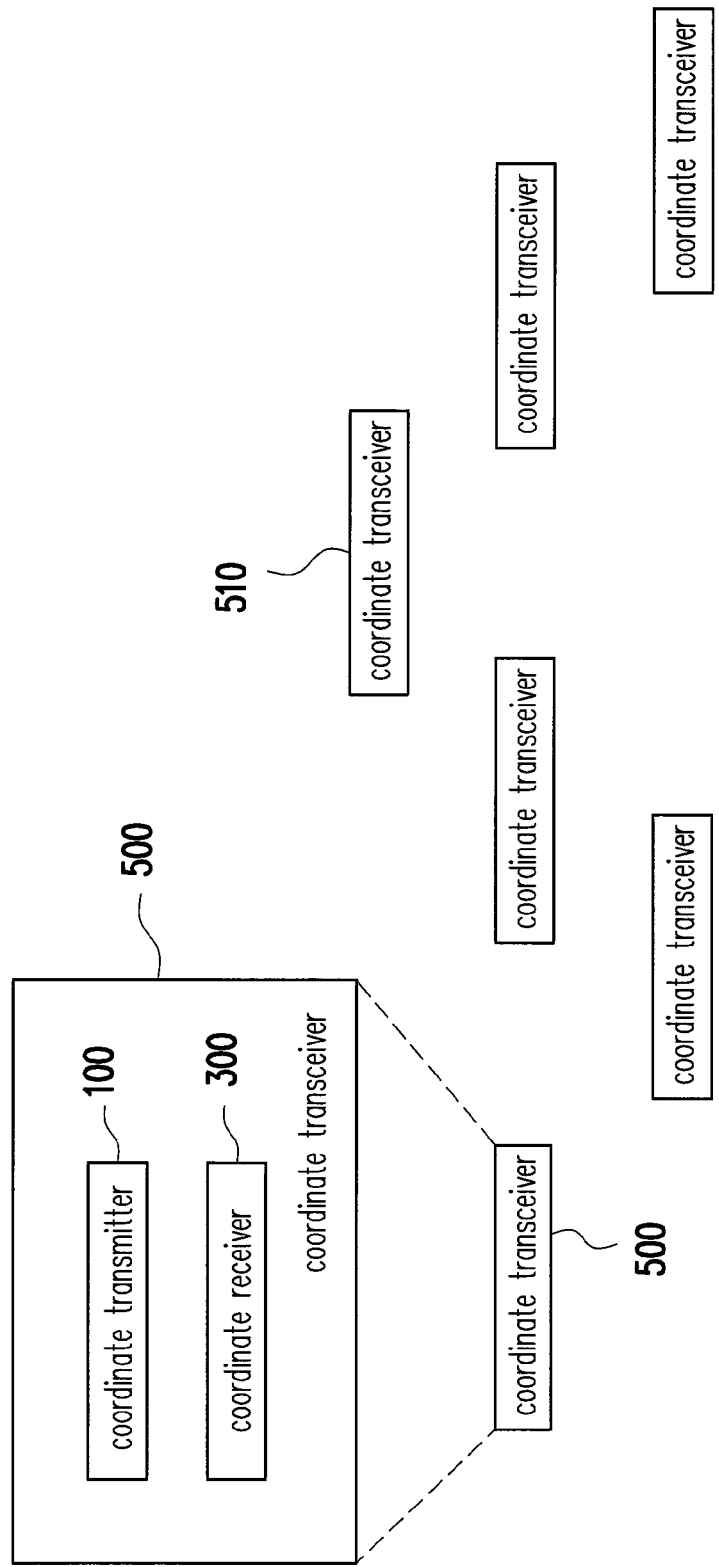
FIG. 5 is a schematic diagram illustrating a coordinate transceiver according to an embodiment of the invention.

FIG. 5 is a schematic diagram illustrating a coordinate transceiver according to an embodiment of the invention. In the present embodiment, a coordinate transceiver 500 includes the coordinate transmitter 100 and the coordinate receiver 300. Details regarding characteristics of the coordinate transmitter 100 and the coordinate receiver 300 may refer to the description in the foregoing embodiments, thus related description is omitted herein.

Further, other coordinate transceivers may also include the coordinate transmitter 100 and the coordinate receiver 300 identical or similar to that of the coordinate transceiver 500. Accordingly, each of the coordinate transceivers depicted in FIG. 5 may mutually obtain the coordinates from other coordinate transceivers. For instance, the coordinate transmitter 100 in the coordinate transceiver 500 may execute each steps depicted in FIG. 2, so as to transmit the coordinate data string and the dual tone multi frequency signal set of the coordinate transceiver 500. Subsequently, when another coordinate transceiver (e.g., a coordinate transceiver 510) receives the dual tone multi frequency signal set transmitted from the coordinate transceiver 500, the coordinate receiver of the coordinate receiver 510 may then execute each step depicted in FIG. 4, so as to obtain the coordinate data string of the coordinate transceiver 500.

In summary, the coordinate transmitter proposed by the embodiments of the invention is capable of replacing the mark in the coordinate data string, followed by performing broadcast with the corresponding dual tone multi frequency signal set, and after the dual tone multi frequency signal set is received by the coordinate receiver proposed by the embodiments of the invention, the coordinate data string of the coordinate transmitter may be correspondingly reverted to obtain the location of the coordinate transmitter. Since the coordinate transmitter may transmit the dual tone multi frequency signal set without going thorough the telecommunication infrastructure, in case the coordinate transmitter is in the area such mountain area, the coordinate transmitter may still successfully transmit the coordinate data sting. In addition, when the coordinate transmitter and the coordinate receiver are integrated into the coordinate transceiver, the coordinate transceiver is capable of both transmitting the coordinate data string of its own and reverting the coordinate data string from other transmitters or other coordinate transceivers.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A coordinate transmitter, comprising:
   a global positioning system module, receiving a global positioning system signal set;
   a processor, coupled to the global positioning system module, configured for:
      capturing a coordinate data string of the coordinate transmitter from the global positioning system signal set, wherein the coordinate data string including at least one numeric data, at least one English letter data and at least one punctuation mark data;
      replacing the at least one English letter data and the at least one punctuation mark data in the coordinate data string by replacing the at least one English letter data and the at least one punctuation mark data in the coordinate data string according to a dual tone multi frequency conversion table, wherein the at least one English letter data includes a latitude symbol and a longitude symbol, and the at least one punctuation mark data includes at least one comma and at least one full stop, and the processor is configured for replacing the at least one comma with at least one first symbol, replacing the at least one full stop with at least one second symbol, replacing the latitude symbol with a third symbol and replacing the longitude symbol with a fourth symbol;
      converting the replaced coordinate data string into a dual tone multi frequency signal set; and
   a communication module, coupled to the processor and configured for transmitting the dual tone multi frequency signal set.

2. The coordinate transmitter of claim 1, wherein the processor is further configured for:
   appending a fifth symbol in front of the replaced coordinate data string; and
   appending a sixth symbol at back of the replaced coordinate data string.

3. A coordinate receiver, comprising:
   a communication module receiving a dual tone multi frequency signal set from a coordinate transmitter; and
   a processor coupled to the communication module, and configured for:
      decoding the dual tone multi frequency signal set to generate a data string, wherein the data string including at least one numeric data, at least one first symbol, at least one second symbol, a third symbol and a fourth symbol;
      replacing the at least one first symbol, the at least one second symbol, the third symbol and the fourth symbol in the data string by replacing the at least one first symbol with at least one comma, replacing the at least one second symbol with at least one full stop, replacing the third symbol with a latitude symbol and replacing the fourth symbol with a longitude symbol mark; and
      analyzing the replaced data string to obtain a coordinate data string of the coordinate transmitter.

4. The coordinate receiver of claim 3, wherein the data string further includes a fifth symbol indicating a start of the data string and a sixth symbol indicating an end of the data string, and the processor is further configured for:
   removing the fifth symbol and the sixth symbol.

5. A coordinate transceiver, comprising:
   a coordinate transmitter, comprising:
      a global positioning system module, receiving a global positioning system signal set;
      a first processor, coupled to the global positioning system module, and configured for:
         capturing a first coordinate data string of the coordinate transmitter from the global positioning system signal set, and the first coordinate data string including at least one first numeric data, at least one English letter data and at least one punctuation mark data;
         replacing the at least one English letter data and the at least one punctuation mark data in the first coordinate data string by replacing the at least one English letter data and the at least one punctuation mark data in the coordinate data string according to a dual tone multi frequency conversion table, wherein the at least one English letter data includes a latitude symbol and a longitude symbol, and the at least one punctuation mark data includes at least one comma and at least one full stop, and the first processor is configured for replacing the at least one comma with at least one first symbol, replacing the at least one full stop with at least one second symbol, replacing the latitude symbol with a third symbol and replacing the longitude symbol with a fourth symbol;

converting the replaced first coordinate data string into a first dual tone multi frequency signal set;

a first communication module, coupled to the first processor and configured for transmitting the first dual tone multi frequency signal set; and a coordinate receiver, comprising:

a second communication module, receiving a second dual tone multi frequency signal set from another coordinate transceiver;

a second processor, coupled to the second communication module, and configured for:

decoding the second dual tone multi frequency signal set to generate a data string including at least one second numeric data, at least one first symbol, at least one second symbol, a third symbol and a fourth symbol;

replacing the at least one first symbol, the at least one second symbol, the third symbol and the fourth symbol in the data string by replacing the at least one first symbol with the at least one comma, replacing the at least one second symbol with the at least one full stop, replacing the third symbol with the latitude symbol and replacing the fourth symbol with the longitude symbol mark; and analyzing the replaced data string to obtain a second coordinate data string of the another coordinate transceiver.

* * * * *